July 17, 1956 T. GURNEY 2,755,044
DE-ICING ARRANGEMENTS FOR ENGINE COOLING SYSTEMS
Filed May 25, 1950 2 Sheets-Sheet 1
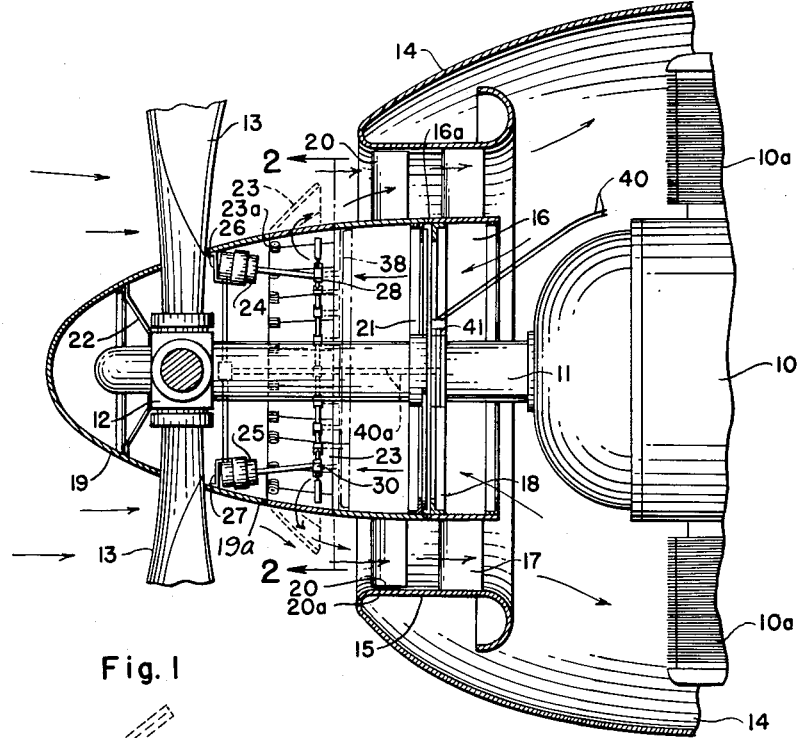
Fig. 1
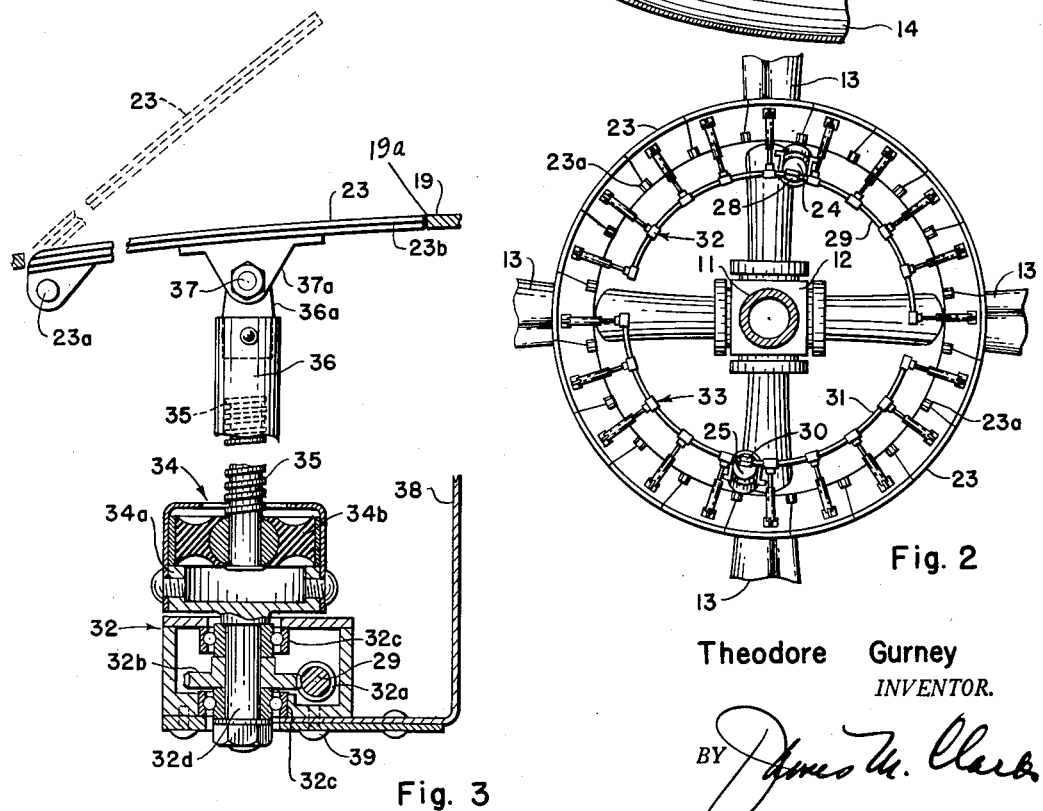
Fig. 2
Fig. 3
Theodore Gurney
*INVENTOR.*
BY *James M. Clark*
HIS PATENT ATTORNEY.

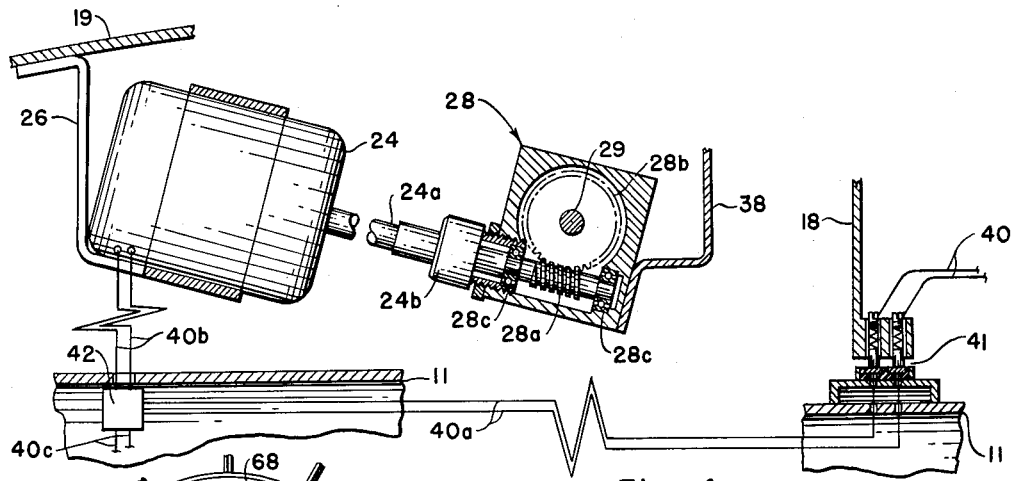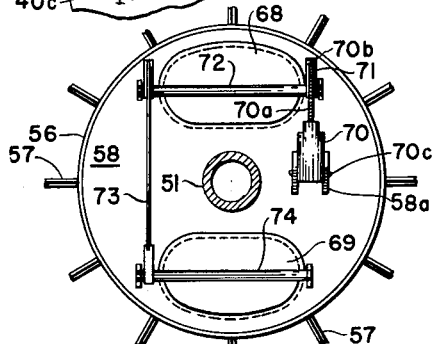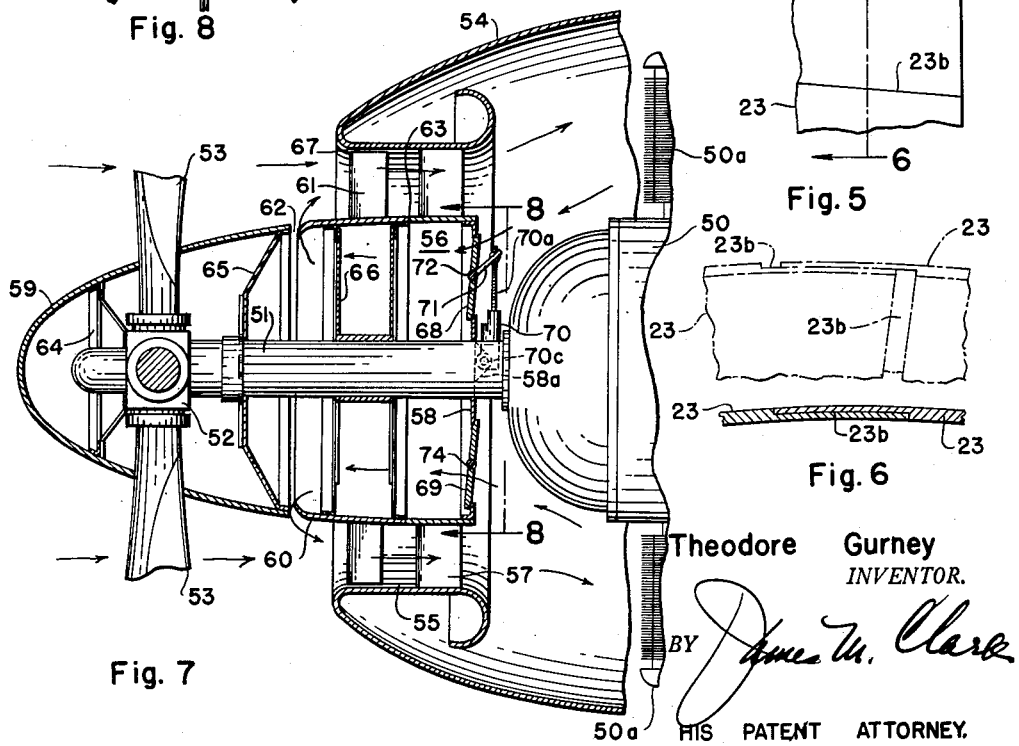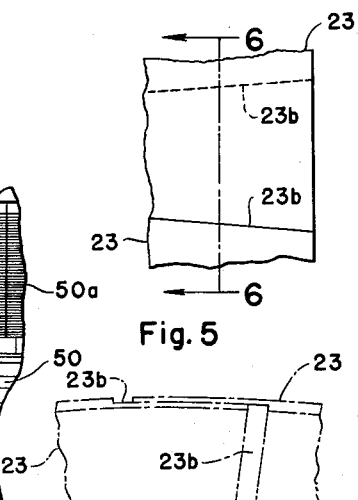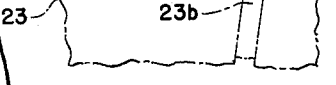

United States Patent Office 2,755,044
Patented July 17, 1956

2,755,044
DE-ICING ARRANGEMENTS FOR ENGINE COOLING SYSTEMS

Theodore Gurney, Glastonbury, Conn., assignor to United Aircraft Corporation, East Hartford, Conn., a corporation of Delaware Application May 25, 1950, Serial No. 164,266

5 Claims. (Cl. 244—134)

The present invention relates generally to engine cooling systems and more particularly to improvements in de-icing arrangements for the cooling fans of air cooled aircraft engines.

It has frequently been found desirable in the cooling of air cooled aircraft engines to augment and improve the air flow through the entrance of the engine cowl by the use of a cooling fan, a spinner assembly and related components which are generally located in the region of the air intake entrance or mouth of the cowl. Such cooling fans and associated components are frequently susceptible to severe icing conditions and the problems of de-icing these components have at times been numerous, complicated and troublesome. The present invention is directed to improved arrangements of the cowl, spinner and cooling fan as well as other adjacent and related elements wherein controlled de-icing of the cooling fan blades is accomplished in a simple and effective manner by utilizing heated air brought forward from within the cowled engine compartment.

The improved cooling fan de-icing arrangement provided in a preferred form of the present invention includes the provision of a plurality of controllable flap valves arranged in an annular series around the spinner surface aft of the propeller blade location and forward of the cooling fan. As the flap valves are moved into their opened positions, they permit the recirculation of warm air from within the engine compartment and forward through the spinner interior from which they are directed into the fan blade assembly. In this form of the invention the stream of cold air has its major portion diverted around the exterior of the engine cowl, due to the deflecting baffle effect of the opened flap valves, while the lesser portion of the air which enters the cowl is caused to undergo an abrupt change in the direction of flow such that entrained particles of moisture and ice are diverted from the air intake opening and its impingement upon the fan blades is prevented. In a further form of the present invention, an annular slot in the spinner is disposed behind the propeller blade location, but forward of the cooling fan blades, and includes suitable valve means, within the stator portion forming the rear of the spinner outline, for controllably admitting warm air from within the engine compartment for recirculation through the fan.

It is, accordingly, a major object of the present invention to provide an improved arrangement of the cowl, spinner and cooling air fan for an air cooled engine. It is a further object to provide means for the de-icing protection of the cooling fan blades and adjacent components in such installations. A further object of this invention includes the provision of improved arrangements wherein the heated air from the engine compartment is caused to be drawn forwardly in reverse flow for recirculation through the spinner and the cooling fan assembly. A further object resides in improved means and mechanism for controlling and regulating such warm air flow under varying conditions.

Other objects and advantages of the present invention will occur to those skilled in the art after reading the present specification, taken in conjunction with the accompanying drawings, forming a part hereof, in which:

Fig. 1 is a longitudinal cross-sectional view of an air cooled power plant installation to which a preferred form of the present invention has been applied;

Fig. 2 is a transverse cross-sectional view of the same looking forward, as taken along the lines 2—2 of Fig. 1;

Fig. 3 is an enlarged detail view of a portion of the operating mechanism for certain of the flap valves shown in the preceding figures;

Fig. 4 is a similar view of one of the actuating motors for the upper series of flap valves;

Figs. 5 and 6 are fragmentary views of a pair of flap valves showing their overlapping sealing relationship;

Fig. 7 is a longitudinal cross-sectional view of a further embodiment of the invention; and Fig. 8 is a transverse elevational view looking forward as taken along the lines 8—8 of Fig. 7 showing the valves at the aft end of the stator portion of the spinner.

Referring now to Figs. 1 and 2, the numeral 10 indicates the forward portion of the crankcase of an air cooled engine driving the forwardly extending propeller shaft 11, upon the forward portion of which is suitably mounted the propeller blades 13 by means of its hub assembly 12. The engine 10 is provided with a plurality of heat dissipating finned cylinders 10a and is enclosed by a streamlined cowl 14 provided with a cooling air mouth or entrance defined by the inwardly and rearwardly extending cowl lip portion 15. Within the mouth of the cowl and coaxially disposed about the axis of the propeller shaft 11, there is disposed the stator portion 16 of the spinner, this stationary portion being supported inwardly from the cowl lip portion 15 by means of the straightening vanes 17 and may also be supported externally from the shaft 11 by means of the supporting framework 18.

A streamlined spinner 19 is provided about the propeller hub 12 and the root portions of the propeller blade 13, being streamlined in outline and forming the forward rotatable component or rotor portion of the spinner aligned with the rear fixed or stator portion 16 by means of a suitable minimum clearance space or joint at 16a. The spinner 19 is fixedly supported from the propeller shaft and hub assembly and carries upon its aft portion the rotatable cooling fan blades 20 located within the cowl mouth. The spinner rotor is carried from the shaft and hub assembly by the supporting framework 21 at the aft end of the spinner, adjacent the joint 16a, and by the supporting structure 22 in the region of the nose of the spinner. It will be understood that the aft end of the stator portion 16 is open and the supporting structures or framework spiders 18 and 21 are sufficiently open such that they offer relatively little resistance to the longitudinal flow of air through the interior of the spinner-stator combination 19—16. The arrangement disclosed in Fig. 1 includes the relatively fixed elements which comprise the engine 10, its cowl 14 and cowl mouth 15, the fixed portion of the spinner or stator 16 and the air straightening vanes 17; and the rotatable elements of the arrangement which include the propeller shaft 11, with which rotate the propeller hub assembly 12 and the propeller blades 13, as well as the spinner rotor portion 19 and the cooling fan blades 20. Accordingly, the regions in which relative movement occurs between the fixed and rotatable elements lie along the transverse vertical plane defined by the clearance joint 16a between the stator and rotor portions of the spinner assembly, and also within the clearance space 20a at the tips of the fan blades 20 which rotate within the cylindrical cowl mouth 15.

Through the outer wall of the rotatable spinner portion 19, aft of the propeller blades 13 and forward of the fan blades 20 there is provided an annular or circumferentially extending opening closable by an annular series of controllable flaps 23. The latter are pivotally mounted at their forward edges by the hinges 23a and are controllable such that they open outwardly as indicated in the broken lines in Fig. 1. The controllable flaps 23 are actuated in two sets or series by means of the reversible electric motors 24 and 25 which are suitably supported from the spinner structure by brackets 26 and 27 as indicated in Fig. 4. These flap actuating installations are preferably identical and are symmetrically disposed about the axis of rotation of the propeller shaft 11 in order that no unbalancing effects are created; and for the purposes of the present description only the upper installation as shown in Fig. 1 will be fully described as it appears in greater detail in Figs. 3 and 4. The extended shaft 24a of the motor 24 is suitably coupled to the worm and worm wheel reduction unit 28 which in turn is supported from the spinner structure by the annular supporting bracket 38 as attached by the screws 39. The worm reduction unit includes a worm wheel 28a driving the worm gear 28b to which is keyed the pivot shaft 29 which extends outwardly in opposite directions from the reduction unit 28 as shown in Fig. 2 for the drives of the respective flaps. The motor shaft 24a is suitably coupled to the worm wheel shaft by the coupling fitting 24b and the latter shaft is journalled in the bearings 28c. It will, accordingly, be understood that the extensions of the shaft 29 are preferably of flexible shafting as they extend arcuately in a semi-circle around the interior of the spinner as shown in Fig. 2.

The flexible shaft portion 29 drives a series of further worm reduction units 32, there being one of these units for each of the flap elements 23, and to obtain further speed reduction for sufficiently slow operation of the flaps 23 and adequate application of torque or power thereto, the shaft 29 drives the worm wheels 32a of the units 32 in mesh with the worm gears 32b which are keyed to the radially extending shaft 32d journalled within the bearings 32c. Adjacent each reduction unit 32 there is provided a flexible coupling 34, the driving portion of which is the cup-shaped element 34a which is integral with the above-mentioned shaft 32d. Each flexible coupling 34 is provided with an elastic torque transmitting unit 34b to which the terminal of the lead screw element 35 is fixed. The outer threaded portion of the lead screw 35 engages the internal threads of the tubular socket or push-pull rod member 36 provided with an outer terminal fitting 36a which is pivotally connected to the pivot fitting 37a fixed to the flap 23 and articulated to the hinge pin 37. The motors 24 and 25 are reversible and may preferably be provided with suitable limit or microswitches to interrupt the current to the respective motor as the flaps reach their extreme positions, and each motor is controllable such that it may be stopped at an intermediate position in which the desired effects of the controllable flaps are best obtained. The elastic portion 34b of the flexible coupling 34 permits a wide range of angular tilting of the axis of the lead screws 35 with respect to the axis of the driven shaft 32b such that the extensible push-pull rod combination 35—36 may follow the arcuate path of the pin 37 as the flap is controlled between its open and closed positions.

In Fig. 4, there is shown in greater detail the electric circuit, outlined in Fig. 1, by means of which the motors 24 and 25 are energized and controlled. The electrical leads 40, from a suitable source of power or electrical energy within the aircraft, are carried to the brushes of a slip ring assembly 41 operatively disposed between the inner flange of the stator supporting bracket or framework 18 and the propeller shaft 11. The leads 40a, which are suitably connected to the slip rings of the unit 41, are carried forward to a suitable junction fitting 42 at which they branch as at 40b and 40c to the respective motors 24 and 25.

In order to provide a smooth and continuous surface of the series of controllable flaps 23 in their retracted, extended and intermediate positions of adjustment, they may preferably be rabbeted as shown at 23b in Figs. 5 and 6 such that they slidingly overlap as they are actuated. In each of these figures in solid lines the flaps have been indicated in their closed positions, whereas in the broken lines in Fig. 6, they have been indicated in a partially opened position in which a substantially continuous surface is presented to the airstream and flow between the edges of the respective flaps is blocked by the overlapping portion of the adjacent flap elements. It will be understood that a continuous or completely circumferential series of flaps 23 will create a substantially complete opening and effects a longitudinal separation of the two rotatable spinner portions, namely, that forward of the flap opening and the shorter portion of greater diameter aft of the flap opening and to which the fan blades 20 are attached. The aft portion of the forward spinner portion and the forward portion of the aft rotatable spinner portion will accordingly preferably be supported from the propeller shaft as by similar spiders or internal supports such as 21 and 22.

It will, accordingly, be seen that the controllable flaps 23 provided within the spinner assembly 19 can be either automatically (by suitable temperature or other detector control) or manually opened to permit air from the interior of the cowled engine compartment within which it has been warmed by circulation over the engine cylinders 10a, and by compression of the cooling fan blades 20, is caused to re-enter the cold air stream through the openings 19a in the wall of the spinner 19 as controlled by the flaps 23 at a point of low static pressure. At the same time, the obstruction provided by the extended flaps 23 before the fan blades 20 prevents further direct impingement by icing particles from the cold air stream on the fan blades 20 while the cold air which does enter the cooling fan must make a relatively sharp turn in direction which effects inertia separation of any icing particles which it may carry.

In the modification which is shown in Figs. 7 and 8, the numeral 50 represents the forward portion of an air cooled aircraft engine which is provided with finned cooling cylinders 50a, the engine driving the propeller shaft 51, on the forward portion of which is mounted the propeller hub assembly 52 and the propeller blades 53. The engine 50 is enclosed by a cowl 54 having a cylindrical mouth or entrance portion 55 within the rear portion of which is fixedly disposed the stator assembly 56 concentrically disposed within the cowl mouth 55. Extending inwardly radially between the cowl mouth 55 and the stator 56 is a series of straightening vanes 57 which also assist in positioning and supporting the stator 56 in respect to the cowl 54 and its mouth 55. The inner or aft end of the stator 56 is provided with a transverse wall or bulkhead 58 provided with a central opening which may clearingly fit about the rotating propeller shaft 51 or at which junction a suitable bearing may be provided for its support. A forward rotatable spinner portion 59 is provided both fore and aft of the propeller blade assembly 53 and a rear rotatable spinner portion 60 is provided intermediate the stator 56 and the nose spinner 59, thereby providing a faired streamlined continuation of the adjacent spinner surfaces. The rear spinner portion 60 has integrally mounted thereon the external radially extending cooling fan blades 61 which extend into the annular air entrance between the central spinner portion and the cowl mouth 55 to augment the flow of cooling air into the engine compartment within the cowl 54. The leading edge of the rear spinner portion 60 is inwardly turned and spaced from the trailing edge of the nose spinner portion 59 to provide an air exit gill or annular opening 62 through the surfaces of the rotatable spinner portions and just forward of the entrance of the cowl mouth.

The spinner assembly, as shown in Fig. 7, is accordingly composed of a fixed rear stator 56, a rotatable forward or nose spinner 59 and an intermediate rotatable fan-blade carrying spinner portion 60. As indicated above, a warmed air exit is provided between the nose spinner 59 and the intermediate rotatable spinner 60 as at the gap 62 and a clearance space 63 is provided between the fixed stator 56 and the spinner portion 60, this clearance space being of a minimum dimension to prevent flow between the interior and exterior of the spinner surfaces. The forward spinner 59 is suitably supported from the hub structure by the supporting framework 64 and at its trailing portion is supported by the transverse frusto-conic shaped bulkhead or wall 65 which is also formed to deflect the forwardly moving warm air outwardly and rearwardly as it strikes the wall 65. The intermediate spinner portion 60 is suitably fixed to and supported from the propeller shaft 51 by the spider framework 66 which is sufficiently open as not to restrict longitudinal flow of the warmed air. A suitable clearance space 67 is provided between the tips of the cooling fan blades 61 and the cowl mouth portion 55 as the fan blades rotate with the spinner portion 60 and the propeller shaft 51. Inasmuch as the combined effect of the rammed air flow into the cowl mouth, and the compression of the fan blade 61 creates a region of high static pressure within the cowl 54, and a region of lower static pressure is created at the spinner warm air exit 62, there is a tendency of the warm air to flow forward through the stator 56 and the rear spinner portion 60 toward the outlet 62. This warm air flow is controlled by the pivotally mounted valves 68 and 69 controlling openings within the bulkhead 58 and actuated by the electric motor 70. The latter is preferably pivotally mounted upon the lugs 58a by means of the pivot 70c and drives the rotatable screw shaft 70a threadedly engaging the nut 70b carried by the outer end of the arm 71. Both the valve 68 and the arm 71 are fixedly attached to the pivot shaft 72 which is suitably journalled upon the face of the bulkhead 58 and it will accordingly be seen that rotation of the screw shaft 70a in either direction will cause movement of the valve 68 in the corresponding direction. The pivot shaft 72 of the valve 68 is interconnected by the link 73 with the corresponding pivot shaft 74 of the lower valve 69, and, accordingly, both valves 68 and 69 will be operated simultaneously. The electric motor 70 is preferably of the reversible type and may be either automatically or manually controlled in accordance with the particular de-icing effects which may be required. It will, accordingly, be noted that when the controllable valves 68 and 69 are opened, warm air is permitted to move forwardly from the engine compartment through the openings in the bulkhead 58, and with assistance of the cooling fan, to re-enter the cold air stream at the spinner exit 62 in a region of low static pressure. The de-icing is, accordingly, effected by the introduction of warmed air after it has been circulated over the engine cylinders 50a, into the cooling air stream ahead of the fan blades 61, the stator assembly 56 and the vanes 57.

Other forms and modifications of the present invention, both with respect to their general arrangement and the details of the respective parts, which may occur to those skilled in the art after reading the present description are intended to come within the scope and spirit of the present invention as more particularly defined in the appended claims.

I claim:

1. In an aircraft engine installation, an air cooled engine having a propeller shaft, said propeller shaft extending forwardly of said engine, a cowl partially enclosing said engine, said cowl having a forward opening mouth, a propeller carried by said propeller shaft for rotation therewith, a hollow spinner fixed to said propeller shaft and rotatable therewith, cooling fan blades fixedly mounted upon said spinner for rotation therewith within the mouth of said cowl, said spinner provided with air exit means through its outer surface immediately forward of said cooling fan blades and aft of said propeller in a region of low static pressure, valve means pivotally mounted upon the outer surface of said spinner forward of and adjacent said air exit means and so related to said air exit means so as to control the opening thereof for regulating the flow of warmed air from a region of high static pressure within said cowled engine compartment to said air exit means for the de-icing of said cooling fan blades, said valve means including a plurality of overlapping hinged elements extendable into the airstream upon opening of said air exit means for preventing impingement of ice particles upon said cooling fan blades, and reversible power means for operating said valve means.

2. In an aircraft engine installation including an engine, a cowl partially enclosing said engine, a forwardly extending shaft driven by said engine, a hollow spinner fixedly carried by said forwardly extending shaft, cooling fan blades fixedly carried by said spinner for rotation therewith and controllable valve means movably mounted within an annular opening in the surface of said spinner, said valve means including a plurality of plate elements hingedly mounted adjacent their forward edges to the surface of said spinner in a position in which said plate elements control the area of said opening, each said plate element overlapping the adjacent plate element at its lateral edges in a sealed relationship in the closed position of said plate elements in respect to said opening, and means for selectively extending said plate elements into the airstream for introducing warmed de-icing air from within said cowl and said hollow spinner through the opening in the surface of said spinner forward of said cooling fan blades, the said plate elements extendable into the airstream at an oblique angle with respect to said spinner surface for deflecting ice particles from engagement with said cooling fan blades.

3. A cooling fan de-icing arrangement for an aircraft engine installation including an engine, a cowl enclosing said engine, said cowl having a forwardly opening mouth portion, a forwardly extending propeller shaft driven by said engine, a propeller carried by said propeller shaft for rotation therewith, a hollow spinner carried by said propeller shaft and said propeller for rotation therewith, and cooling fan blades carried by said spinner for rotation therewith, the improvement comprising controllable orifice means disposed at the surface of said spinner for introducing warmed de-icing air from within said cowl and said spinner through the surface of said spinner and into the mouth of said cowl forward of said cooling fan blades, said means including a plurality of hinged elements supported upon said spinner, each said hinged element overlapping the adjacent hinged element at its lateral edges in a sealed relationship in the closed position in respect to said orifice, an electrical motor operatively connected to said hinged elements, a slip ring assembly having a rotor carried by said spinner and a fixed stator connected to a source of electrical energy, and means for controlling said motor through said slip ring assembly for the controllable positioning of said hinged elements into the airstream obliquely with respect to said spinner surface for preventing the impingement of ice particles upon said cooling fan blades.

4. A cooling fan de-icing arrangement for an aircraft engine installation including an engine, a cowl partially enclosing said engine, a forwardly extending propeller shaft driven by said engine, a propeller carried by said propeller shaft for rotation therewith, a hollow spinner carried by said propeller shaft for rotation therewith, cooling fan blades carried by said spinner for rotation therewith, an annular opening through the wall of said spinner disposed forward of said cooling fan blades, and valve means arranged as a closure for said annular opening to increase or decrease the area thereof, said valve means including plate elements hingedly mounted upon the wall of said spinner adjacent the forward edges of both said plates and said opening, and power means for extending said plate elements into the airstream for discharging warmed de-icing air into the airstream through said annular opening, said hinged plate elements having their free trailing edges extendible into the airstream obliquely with respect to said spinner surface for deflecting rearwardly and outwardly any ice particles passing rearwardly around said spinner and preventing the same from impinging upon said cooling fan blades.

5. In an aircraft power plant installation, an engine, a cowl enclosing said engine, a cooling fan driven by said engine for augmenting the flow of air into said cowl, a hollow spinner arranged forwardly of and to be rotatably driven by said engine, said spinner having an opening through the surface thereof disposed forward of said cooling fan, valve means carried by said spinner arranged to provide control of circulation of warmed de-icing air from within said cowl and said spinner and through said opening, said valve means including a plurality of plate elements hingedly mounted at their forward edges upon said hollow spinner and adjacent the forward edges of said opening, each said plate element overlapping the adjacent plate element at its lateral edges in a sealed relationship in the closed position of said opening, the said plate elements extendible into the airstream obliquely with respect to said spinner surface for controlling the area of said opening and for preventing impingement of iced particles upon said cooling fan, and power means for extending said plate elements of said valve means into the airstream.

References Cited in the file of this patent

UNITED STATES PATENTS

| | | |
|---|---|---|
| 1,779,186 | Pavlecka | Oct. 21, 1930 |
| 1,851,513 | Holmstrom | Mar. 29, 1932 |
| 1,896,222 | Chilton | Feb. 7, 1933 |
| 2,133,253 | Myers | Oct. 11, 1938 |
| 2,278,206 | Marshall | Mar. 31, 1942 |
| 2,329,606 | Goodman | Sept. 14, 1943 |
| 2,406,473 | Palmatier | Aug. 27, 1946 |
| 2,446,663 | Palmatier | Aug. 10, 1948 |
| 2,482,720 | Sammons | Sept. 20, 1949 |

FOREIGN PATENTS

| | | |
|---|---|---|
| 871,408 | France | Jan. 15, 1942 |